Figure 1:
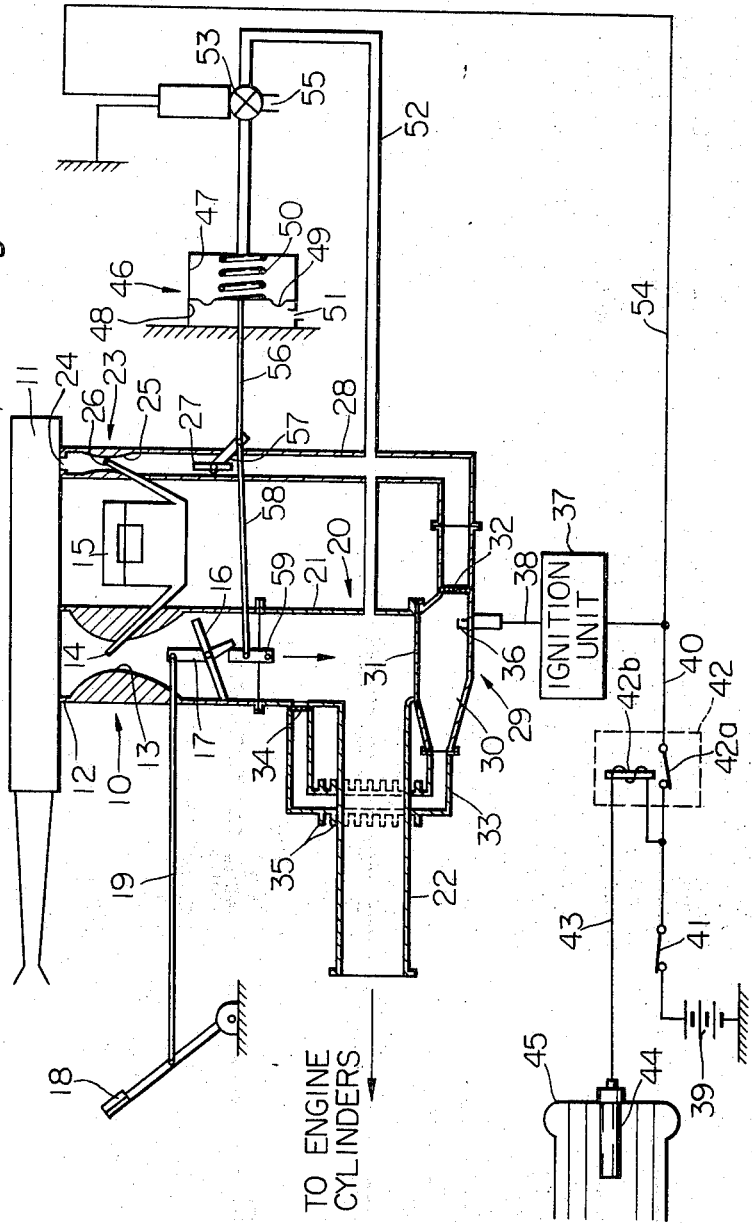

United States Patent [19]
Nambu

[11] 3,828,747
[45] Aug. 13, 1974

[54] AUTOMOTIVE AIR-FUEL MIXTURE HEATING SYSTEM

[75] Inventor: Shyuya Nambu, Yokohama City, Japan

[73] Assignee: Nissan Motor Company, Limited, Yokohama City, Japan

[22] Filed: Dec. 14, 1972

[21] Appl. No.: 315,000

[30] Foreign Application Priority Data
Dec. 24, 1971  Japan.................................. 46-1393

[52] U.S. Cl. 123/122 AB, 123/119 A, 123/122 AC, 123/122 G, 123/122 H, 123/179 H
[51] Int. Cl. F02m 25/06, F02m 31/02, F02n 17/04
[58] Field of Search..... 123/179 H, 122 G, 122 AC, 123/122 H, 122 AB, 119 A, 133

[56] References Cited
UNITED STATES PATENTS

| | | | |
|---|---|---|---|
| 1,424,394 | 8/1922 | Doolittle | 123/122 G |
| 1,648,515 | 11/1927 | Taylor et al. | 123/122 G |
| 1,687,918 | 10/1928 | Woolson | 123/122 G |
| 1,843,257 | 2/1932 | Woolson | 123/122 G |
| 2,225,647 | 12/1940 | Liekendael | 123/122 G |
| 2,229,714 | 1/1941 | Wirrer | 123/179 H |
| 2,408,846 | 10/1048 | Golden et al. | 123/119 A |
| 2,993,487 | 7/1961 | Konrad et al. | 123/122 G X |
| 3,625,190 | 12/1971 | Boissevain | 123/122 AC |
| 3,687,122 | 8/1972 | Kamo | 123/122 G |

FOREIGN PATENTS OR APPLICATIONS

| | | | |
|---|---|---|---|
| 488,368 | 11/1952 | Canada | 123/122 G |

Primary Examiner—Charles J. Myhre
Assistant Examiner—Tony Argenbright

[57] ABSTRACT

For the purpose of reducing toxic combustible compounds remaining in exhaust gases from an automotive internal combustion engine which usually demands an enriched air-fuel mixture during cold driving, a combustion chamber is positioned in contact with an interior of a mixture supply passage for the engine so as to positively heat the mixture passing through the mixture supply passage when the engine is being driven cold, whereby the vapourization of the air-fuel mixture in the mixture supply passage is promoted and even distribution of the mixture to individual engine cylinders is achieved. The hot exhaust gases produced in the combustion chamber may be recirculated into the mixture supply passage to contribute to further heating of the mixture therein.

27 Claims, 2 Drawing Figures

AUTOMOTIVE AIR-FUEL MIXTURE HEATING SYSTEM

The present invention relates generally to automotive internal combustion engines and particularly to air-fuel supply units such as carburetors of the automotive internal combustion engines. More specifically, the invention appertains to an exhaust cleaning system for use with the mixture supply unit of the automotive internal combustion engine. The exhaust cleaning system herein disclosed is of the specific character by which the air-fuel mixture receives added heat when passing through a mixture passage of the air-fuel mixture supply unit so that improved vapourization of the mixture is assured and accordingly the amount of toxic unburned compounds in the exhaust gases is reduced. The exhaust cleaning system is thus adapted to provide a useful solution to the present-day vehicular air pollution problems.

It is well known in the art that the richer the air-fuel mixture supplied to the automotive internal combustion engine the higher the concentration of the toxic unburned or partly burned compounds such as hydrocarbons and carbon monoxide contained in the exhaust gases from the engine. An enriched air-fuel mixture is required especially when the engine is driven cold, viz., being warmed up because the air-fuel mixture itself then remains cool and is consequently unable to achieve an acceptable combustion efficiency. During cold driving of the engine, moreover, it is necessary to supply an extra fuel or hydrocarbons to the engine for the purpose of compensating for the degraded vapourability of the air-fuel mixture with the result that the mixture supplied to the engine is further enriched. The extra fuel or hydrocarbons are discharged unburned or partly burned from an exhaust system of the engine, becoming a major source of the pollution of air. The degraded vapourability of the air-fuel mixture, on the other hand, results in adhesion of fuel particles with relatively large grain sizes to internal walls of the mixture supply unit. The fuel particles thus adhered to the internal walls of the unit during the cold driving condition of the engine are warmed up and accordingly vapourized as the engine is warmed up to an operating temperature and give rise to further enrichment of the air-fuel mixture supplied to the engine, thereby adding to the concentration of the toxic combustible compounds in the exhaust gases.

In order to clean up the exhaust gases, it has thus far been proposed and put into practice to have the combustible compounds in the exhaust gases re-oxidized into harmless gases through use of special after burners or catalytic converter arrangements which are installed in or adjacent the exhaust systems or to have the air-fuel mixture preheated to promote vaporization of the mixture by transfer of heat thereto from engine cooling water or exhaust gases recirculated to the mixture supply units such as intake manifold of the carburetors. All these exhaust cleaning means are, however, effective when the engine are driven at operating temperatures, viz., have been sufficiently warmed up and, for this reason, hardly lend themselves to the purpose of reducing the concentrations of the toxic compounds in the exhaust gases under the cold driving conditions of the automotive internal combustion engines even though the toxic compounds are produced in increased concentrations under the particular conditions.

It is, therefore, an important object of the present invention to provide an improved exhaust cleaning system for use with the automotive internal combustion engine, which system is specifically adapted to reduce the concentration of the toxic unburned or partly burned compounds in the exhaust gases from the engine which is being driven cold, viz., warmed up to an operating temperature.

It is another important object of the invention to provide an improved exhaust cleaning system of the automotive internal combustion engine, which cleaning system is adapted to provide a satisfactory combustion efficiency in the engine without use of an enriched air-fuel mixture during cold driving of the engine.

It is still another important object of the present invention to provide an improved automotive engine exhaust cleaning system assuring improved vapourization of the air-fuel mixture passing through the air-fuel mixture supply unit of the engine when the engine is being driven at a temperature lower than the predetermined operating temperature.

It is still another important object of the invention to provide an improved automotive engine exhaust cleaning system adapted to prevent adhesion of the fuel particles to the internal walls of the air-fuel supply unit of the engine.

Yet, it is another important object of the present invention to provide an improved exhaust cleaning system of the automotive internal combustion engine, which cleaning system is operative under the cold driving condition of the engine for preheating the air-fuel mixture passing through the mixture supply passing of the air-fuel supply unit such as the carburetor or fuel injection system of the engine.

All these objects of the present invention will be advantageously accomplished in an exhaust cleaning system which comprises a combustion chamber which is in direct contact with the interior of at least part of the mixture passage of the air-fuel supply unit of the engine through at least one heat-transfer partition member, an additional air-fuel mixture supply unit for supplying a mixture of air and fuel to the combustion chamber at a controlled rate when actuated, firing means for igniting the air-fuel mixture drawn into the combustion chamber from the additional air-fuel supply unit when actuated, and temperature-responsive actuating means responsive to change in temperature of the engine and operative to actuated the additional air-fuel mixture supply unit and the firing means when responding to an engine temperature lower than a predetermined relatively low level representative of a cold driving condition of the engine. The cleaning system may further comprise mixture supply rate control means associated with the additional air-fuel mixture supply unit and adapted to be actuated by the temperature-responsive actuating means for providing communication between the combustion chamber and additional air-fuel mixture supply unit when actuated by the temperature-responsive actuating means, viz., the engine is being warmed up to its operating temperature. When desired, the mixture supply rate control means may be further associated with the air-fuel mixture supply unit of the engine proper and so arranged as to be responsive not only to the engine temperature but to an idling condition of the engine for supplying the air-fuel mixture to the engine at an appreciably increased rate under the idling condition. The combustion chamber has an outlet which is opened directly to the open air or into the mixture passage of the air-fuel mixture supply unit for the engine.

The air-fuel mixture supply unit of the internal combustion engine with which the exhaust cleaning system having the above described general features is to be combined may be the carburetor or the fuel injection system of the usual construction. Where it is desired that the exhaust cleaning system herein disclosed be installed on the carburetor in particular, the combustion chamber may preferably be in contact with at least a portion of an intake manifold riser forming part of the carburetor. Likewise, the air-fuel mixture supply unit for the combustion chamber of the exhaust cleaning system per se may be of a carburetor or fuel injection type. Where, in particular the carburetor is preferred as the mixture supply unit for the combustion chamber, the throttle valve thereof forms part of the aforementioned mixture supply rate control means for the combustion chamber and thus shuts off the flow of the air-fuel mixture to the combustion chamber when the temperature-responsive actuating means responds to an engine temperature higher than the predetermined level. If, in this instance, the cleaning system of the particular character is used in combination with the internal combustion engine incorporating the carburetor as above mentioned, then the mixture supply rate control means may include a suction-operated valve drive unit which is adapted to be controlled by the temperature-responsive actuating means and to be responsive to a suction or vacuum developed in the intake manifold of the engine. The suction-operated valve drive unit drives, when actuated from the temperature-responsive actuating means, drives the throttle valve of the carburetor of the cleaning system to its closed-throttle position to terminate the passage of the flow of the air-fuel mixture therethrough. Where desired, this suction-operated valve drive unit may be further associated with the throttle valve of the carburetor of the engine proper for driving the valve to open appreciably wider under the control of the temperature-responsive actuating means during idling of the engine.

Figure 2:
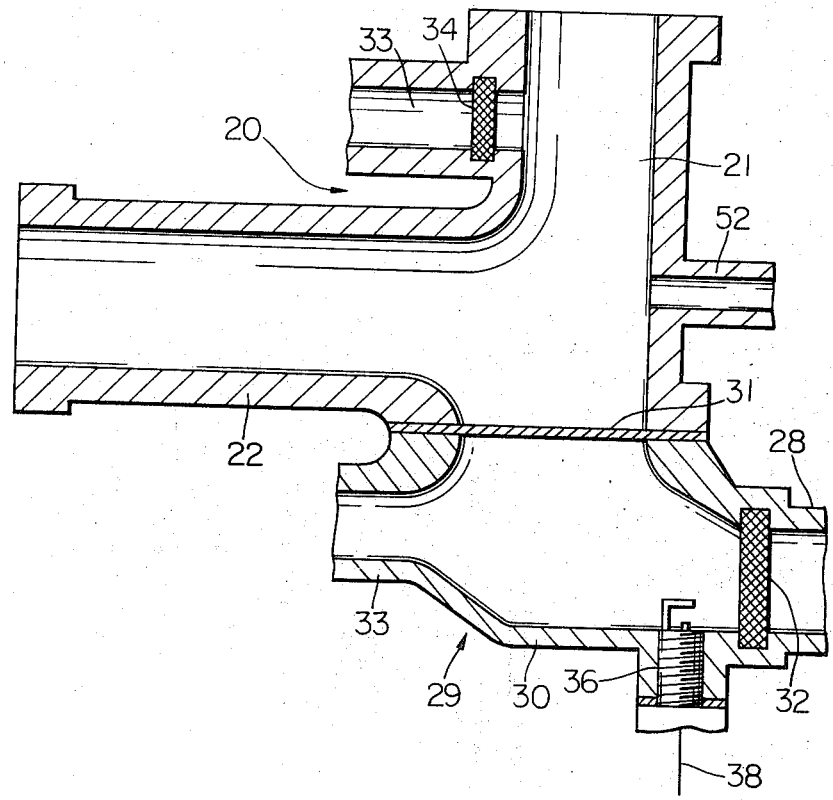

More detailed features and advantages of the exhaust cleaning system according to the present invention will become apparent from the following description taken in conjunction with the accompanying drawings in which:

FIG. 1 is a schematic view showing, partly in section, an overall construction of the exhaust cleaning system embodying the present invention; and FIG. 2 is a sectional view showing, on an enlarged scale, the combustion chamber of the exhaust cleaning system shown in FIG. 1.

Reference will now be concurrently made to FIGS. 1 and 2. The exhaust cleaning system according to the present invention is herein shown by way of example as being applied to an automotive internal combustion engine using a carburetor of down-draft type. It should, however, be borne in mind that the essential features of the exhaust cleaning system herein disclosed are applicable to automotive internal combustion engine of any other type including those using carburetors of horizontal-draft type or the fuel injection systems.

The carburetor of the down-draft type, designated as a whole by reference numeral 10 in FIG. 1, thus includes as customary an air cleaner 11 which is mounted at the top of an air horn 12. Internally of the air horn 12 is formed a venturi 13 into which a fuel nozzle 14 leading from a float bowl 15 projects. A carburetor throttle valve 16 is positioned downstream of the venturi 13 for controlling the rate of flow of an air-fuel mixture to be delivered from the carburetor 10. The throttle valve 16 is rotatable about its shaft (not numbered) with a throttle control lever 17 which is driven from an accelerator pedal 18 through a connecting rod 19. The carburetor 10 is connected at its lower end to an intake manifold 20 of the engine. The intake manifold 20 includes a manifold riser 21 positioned immediately downstream of the carburetor 10 and a plurality of manifold branch pipes 22 leading from the manifold riser 21 and connected respectively to cylinders (not shown) of the engine. The manifold riser 21 and manifold branch pipes 22 thus constitute the mixture passage for the carburetor 10. The construction and operation of the carburetor 10 above described are well known in the art and as such no detailed explanation will be herein incorporated for simplicity of description.

The exhaust cleaning system installed on the carburetor 10 thus constructed includes an air-fuel mixture supply unit which is, in the embodiment shown, in the form of a carburetor 23 which is positioned in parallel to but independently of the main carburetor 10 for the engine. Similarly to the main carburetor 10, the additional carburetor 23 communicates at its top with the air cleaner 11 through a calibrated restriction or orifice 24 and has formed therein a constriction or venturi 25 as illustrated. An additional fuel nozzle 26 leading from the float bowl 15 for the carburetor 10 projects into this venturi 25 so that the fuel drawn from the float bowl 15 is atomized and mixed with the fresh air sucked in from the air cleaner at a restricted rate through the orifice 24. A mixture flow control valve or throttle valve 27 is positioned downstream of the venturi 25 for controlling the flow of the air-fuel mixture produced at the venturi 25. The additional carburetor 23 thus constructed is connected through a mixture passageway 28 to a combustion unit which is designated as a whole by reference numeral 29 in FIG. 1.

As better seen in FIG. 2, the combustion unit 29 includes a combustion chamber 30 having an inlet connected to the leading end of the mixture passageway 28 and held in direct contact with the interior of the bottom portion of the manifold riser 21 through a heat-transfer partition member 31. This partition member 31 is preferably a plate of copper, brass, aluminium or steel such as stainless steel of a thickness ranging from 0.5mm to 3.0mm. It is, in this instance, self-explanatory that the thinner the partition member 31, the higher the heat-transfer efficiency and accordingly the better the thermal response of the partition member. If, thus, the thickness of the partition member 31 is reduced to a practically permissible limit, the exhaust cleaning system according to the present invention would become effective to preheat the air-fuel mixture in the intake manifold 20 substantially simultaneously when the engine is started cold. In view, however, of the required durability of the partition member to be placed on actual use, it is important to select the thickness of the member on a compromise between these mutually conflicting requirements for the thermal response and durability. Experiments conducted in this regard with the partition member formed of copper have revealed that a thickness ranging from 1.0mm to 2.0mm provides an acceptable compromise between such requirements. Where it is desired to make available an increased heat-exchange area of the partition member 31 without respect to or even at the sacrifice of the thermal response, the partition member 31 may be provided with fins on one or both of its surfaces, through not shown in the drawings.

At the inlet of the combustion chamber 30 is positioned a flame holder 32 of a wire mesh to prevent the flames in the combustion chamber from being propagated backwardly into the mixture passageway 28. The combustion chamber 30 has an outlet which may be opened directly to the open air though not shown or which may be in constant communication with an unstream portion of the manifold riser 21 through a hot gas recirculation passageway 33 as illustrated. A flame arrester 34 of a wire mesh is positioned at an outlet of the hot gas recirculation passageway 33 for preventing propagation of the flames from the passageway 33 into the manifold riser 21. Where desired, the hot gas recirculation passageway 33 may be externally at least partly wrapped or surrounded by a plurality of fins 35 for the purpose of discharging heat to the outside of the passageway 33 at an increased efficiency.

Suitable firing means is provided which includes a spark plug 36 projecting into the combustion chamber 30 and an ignition unit 37 which is connected to the spark plug through a line 38. The ignition unit 37 and spark plug 36 are adapted to continuously fire the air-fuel mixture delivered into the combustion chamber 30 once they are energized. Thus, the ignition unit 37 has an input terminal which is serially connected to a power source 39 through a line 40 across a usual ignition switch 41 and a relay switch 42 having normally-open contacts 42a and a relay coil 42b. The relay coil 42b is connected through a line 43 to a thermostatically controlled temperature-responsive switch 44 which is embedded in or otherwise mounted on a suitable engine cooling medium such as a water jacket 45 for the cooling of the internal combustion engine (not shown). This temperature-responsive switch 44 is adapted to be open when the engine or more exactly the engine cooling water is sufficiently warmed and to close in response to a temperature lower than a predetermined level of, for example, 60°C.

To control the flow of the air-fuel mixture to the combustion unit 29, a suction-operated throttle valve drive unit is provided which as a whole is designated by reference numeral 46 in FIG. 1. The suction-operated throttle valve drive unit 46 includes a diaphragm device having suction and atmospheric chambers 47 and 48, respectively, which are hermetically sealed from each other by a diaphragm element 49. The suction chamber 47 has accommodated therein a preload spring 50 which is seated at one end on an end wall of the suction chamber 47 and at the other end on the diaphragm element 49. The preload spring 50 thus acts to urge the diaphragm element 49 toward a position compressing the atmospheric chamber 48. To allow air in the atmospheric chamber 48 to escape therefrom when the atmospheric chamber is thus compressed by the displacement of the diaphragm element 49, the atmospheric chamber 48 is usually formed with an air vent 51 which is opened to the atmosphere as shown. The preload spring 50 is herein shown as a helical compression spring but apparently such a spring can be replaced with any other types of resilient biasing means where desired.

The suction chamber 47 is in communication with the intake manifold 20 of the engine or, in the shown embodiment, with the manifold riser 21 of the intake manifold through a suction passageway 52. This suction passageway 52 has incorporated therein a solenoid-operated three-way valve 53 which is electrically connected to the line 40 through a line 54. This solenoid-operated three-way valve 53 is adapted to have two positions. When the three-way valve 53 is energized from the power source 39 through the lines 40 and 54, it assumes a position in which communication is set up between the suction chamber 47 and manifold riser 21 across the valve. Under this condition, the vacuum obtaining in the intake manifold 20 of the engine or generally in the mixture passage downstream of the carburetor throttle valve 16 is drawn into the suction chamber 47 through the suction passageway 52. When, on the contrary, the three-way valve 53 remains deenergized, the valve is held in the other position in which the communication between the suction chamber 47 and the intake manifold 20 is blocked and, in turn, the suction chamber 47 is vented to the open air through an air inlet port 55 which is formed in the valve 53 or in the suction passageway 52.

An actuating rod 56 is connected at one end to the face of the diaphragm element 49 opposite to the preload compression spring 50 and at the other end to the throttle valve 27 of the additional carburetor 23 through a throttle lever 57. This throttle lever 57 is rotatable with the throttle valve 27 about the shaft of the valve and is pivotally connected at its leading end to the actuating rod 56 so that reciprocal movement in either direction of the actuating rod 56 caused by the displacement of the diaphragm element 49 brings about rotation or angular displacement of the throttle valve 27 and accordingly changes the effective working area for the flow of the air-fuel mixture across the throttle valve 27. For the reason to be described later, it is preferable that this actuating rod 56 have an extension 58 terminating in close proximity to the throttle valve 16 of the main carburetor 10 for the engine as illustrated. In this instance, the extension 58 of the actuating rod 56 is connected to the throttle valve 17 through the throttle control lever 17 in a manner to turn the throttle valve about its shaft as the actuating rod 56 is moved back and forth by the diaphragm element 49 of the throttle valve drive unit 46.

In the embodiment shown in FIGS. 1 and 2, it is assumed that the throttle valve 27 of the additional carburetor 23 is turned to an open-throttle position and simultaneously the throttle valve 16 of the main carburetor 10 is turned a predetermined angle toward an open-throttle position from its normal part-throttle position when the actuating rod 56 is moved rightwardly of the drawing, viz., when the suction is drawn from the engine intake manifold 20 into the suction chamber 47 of the suction-operated throttle drive unit 46.

The operation of the exhaust cleaning system constructed and arranged in the above described manner will now be discussed.

When the internal combustion engine is cranked for starting with the ignition switch 41 closed by an ignition key, the air sucked in from the air cleaner 11 is mixed with the fuel drawn into the venturi 13 from the float bowl 15 through the fuel nozzle 14 in the main carburetor 10 for the engine proper. The resultant air-fuel mixture is delivered to the individual engine cylinders (not shown) through the intake manifold 20, viz., the manifold riser 21 and manifold branch pipes 22. The rate at which the air-fuel mixture is supplied to the engine is controlled by the angular displacement of the throttle valve 16 and accordingly in accordance with the depth in which the accelerator pedal 18 is depressed, as is well known.

If the engine is cold when it is thus cranked for rotation and accordingly the temperature of the engine cooling water circulating in the water jacket 45 is lower than a predetermined level of, say, about 60°C for example, then the thermostatically controlled temperature-responsive switch 44 is closed so as to energize the coil 42b of the normally-open relay switch 42 through the line 43. The relay switch 42 thus closes so that an electric circuit is completed from the power source 39 to the ignition unit 37 through the line 40 with the ignition switch 42 held closed. The ignition unit 37 is now energized to actuate the spark plug 36 through the line 38. At the same time, the solenoid-operated three-way valve 53 forming part of the mixture supply rate control means is energized from the power source 39 through the lines 40 and 54 and is driven to the position establishing the communication between the manifold riser 21 of the engine intake manifold 20 and the suction member 47 of the suction-operated throttle valve drive unit 46 which also forms part of the mixture supply rate control means of the cleaning system according to the present invention.

The vacuum prevailing in the intake manifold 20 is consequently drawn into the suction chamber 47 of the throttle valve drive unit 46 through the suction passageway 52 and three-way valve 53. The vacuum in the suction chamber 47 acts upon the diaphragm element 49 which is thus moved against the action of the preload compression spring 50 to a position in which the atmospheric chamber 48 is expanded, the expansion of the chamber 48 being facilitated by air admitting thereto through the air vent 51. This causes the actuating rod 56 to move rightwardly of the drawing (FIG. 1) so as to turn the throttle valve 27 of the additional carburetor 23 to the open-throttle position which is illustrated. Air is consequently sucked in from the air cleaner 11 into the additional carburetor 23 at a rate which is restricted by the orifice 24 while the fuel in the float bowl 15 is drawn into the venturi 25 through the additional fuel nozzle 26. The air and fuel are mixed at the at the venturi 25 and the resultant air-fuel mixture is passed over to the combustion chamber 30 of the combustion unit 29 through the mixture passageway 28 and the flame holder 32 which is positioned at the inlet to the combustion chamber 30. Since, under this condition, the spark plug 36 is in a condition actuated by the ignition unit 37 as previously mentioned, the air-fuel mixture thus drawn into the combustion chamber 30 is fired so as to produce hot gases which heat the heat-transfer partition member 31 contacting the air-fuel mixture which is being passed through the manifold riser 21 of the main carburetor 10. The hot gases are then discharged from the combustion chamber 30 and are drawn into the upstream portion of the manifold riser 21 through the hot gas recirculation passageway 33 and flame arrester 34. The hot exhaust gases are thus admixed to the air-fuel mixture flowing through the manifold riser 21 and exchange heat with the mixture therein. In this instance, flame holder 32 mounted at the inlet of the passageway 33 to the combustion chamber 30 serves to atomize the air-fuel mixture to be admitted to the combustion chamber 30 by means of its fine mesh. Such a mixture atomizing effect of the flame holder 32 is enhanced when the air-fuel mixture is fired and consequently the wire mesh of the flame holder is heated, thereby contributing to the raising of the combustion efficiency of the mixture in the combustion chamber 30. The hot exhaust gases which are recirculated to the manifold riser 21 are cooled down to an appropriate temperature as they are passed through the hot gas recirculation passageway 33 by means of the fins 35 which are mounted thereon while the flame arrester 34 positioned at the outlet of the passageway 33 serves to prevent the firing of the air-fuel mixture in the manifold riser 21 as would be caused by the hot exhaust gases from the passageway 33.

As the air-fuel mixture flows from the manifold riser 21 toward the manifold branch pipes 22 of the engine intake manifold 20 connected to the down-draft type carburetor 10, the particles of fuel having relatively large grain sizes and the fuel propagating down the internal surfaces of the manifold riser 21 tend to be deposited at the lowermost part of the manifold riser which is adjacent to the manifold branch pipes 22. In the internal combustion engines of the prior art constructions, the fuel thus deposited at the bottom of the manifold riser 21 is drawn to the engine cylinders along the internal surfaces of the manifold branch pipes 22 in a liquid phase, providing a major cause of the incomplete combustion of the mixture in the combustion chambers of the engine. By virtue of the provision of the combustion chamber 30 contacting the bottom portion of the manifold riser 21 in the embodiment herein shown, the fuel which is deposited or about to be deposited on the upper face of the heat-transfer partition member 31 heated by the heat-transferred from the hot partition member and is thus caused to be evaporated postively before it is passed to the manifold branch pipes 22. The air-fuel mixture delivered from the intake manifold 20 is thus evenly distributed in a sufficiently evaporated state into the individual engine cylinders and is readily combusted in the engine at a satisfactorily improved combustion efficiency. There is, for this reason, no need of supplying to the engine an enriched air-fuel mixture during cold driving of the engine.

The hot exhaust gases recirculated into the manifold riser 21 from the combustion chamber 30 contributes to further heating the air-fuel mixture to be supplied to the engine, as previously mentioned. The mixture thus receiving the added heat from the partition member 31 is cleared of the particles with relatively large grain sizes so that the mixture can be substantially completely gasified when entering the engine cylinders. Where desired, however, the outlet from the combustion chamber 30 may be vented directly to the open air so that the hot exhaust gases are discharged to the outside of the engine or utilized for any other purposes.

Where the hot exhaust gases from the combustion chamber 90 are directed into the engine intake manifold 20 and admixed to the air-fuel mixture from the main carburetor 10, there would be a risk of the engine performance impaired or made unstable to an appreciable extent especially when the main throttle valve 16 is in a part-throttle condition as during idling of the engine so that it is desired that the throttle valve 16 be opened wider than normal. This is achieved in the embodiment herein shown by means of the extension 58 of the actuating rod 56 drivingly connected to the throttle valve 16 through the throttle control lever 17. When, thus, the diaphragm element 49 of the suction-operated throttle valve drive unit 46 is moved rightwardly of the drawing by the suction drawn into the suction chamber 47 as previously discussed, the throttle valve 16 of the main carburetor 10 is turned a predetermined angle toward its open-throttle position by the axial movement of the actuating rod 56 simultaneously as the throttle valve 27 of the additional carburetor 23 is driven to its open-throttle position. The effective working area at the throttle valve 16 of the main carburetor 10 is thus augmented with a consequent increase in the rate of supply of the air-fuel mixture to the engine, thereby providing a satisfactory performance efficiency of the engine during idling.

When the engine is warmed up to the operating temperature and accordingly the water jacket 45 reaches a temperature higher than a predetermined level, then the thermostatically controlled temperature-responsive switch 44 opens so that the coil 42b of the relay switch 42 becomes de-energized. The ignition unit 37 and solenoid-operated three-way valve 53 are simultaneously disconnected from the power source 39 with the relay switch 42 thus opened, the spark plug 36 ceases firing in the combustion chamber 30 and the communication between the manifold riser 21 and the suction chamber 47 of the throttle valve drive unit 46 is interrupted. The suction chamber 47 is now opened to the atmosphere through the air inlet port 55 so that the diaphragm element 49 is moved by the action of the preload compression spring 50 to a position expanding the suction chamber 47. This causes the actuating rod 56 to turn the throttle valve 27 to the closed-throttle position, thereby interruption the supply of the air-fuel mixture to the combustion chamber 30 through the additional carburetor 23. The combustion unit 29 now rest inoperative and the main carburetor 10 operates independently of the exhaust cleaning system.

The orifice 24 formed intermediate between the air cleaner 11 and the additional carburetor 23 should be so calibrated that air is admitted into the additional carburetor 23 at such a rate as not to successively lean out the air-fuel mixture to be supplied to the engine when the mixture is mixed with the hot exhaust gases from the combustion chamber. This is, of course, because of the fact that supply of an air-fuel mixture containing an excess of air sometimes brings about temporary interruption of the engine operation. It is apparent that such a consideration need not be paid where the combustion chamber 30 has an outlet opened directly to the atmosphere.

To provide ease of adjustment of the suction-operated throttle drive unit 46 during production, it is preferable that the preload spring 50 has a relatively small spring constant and at the same time the diaphragm element 49 has a relatively large size which is suitable for providing a "snap action" of the diaphragm element responsive to the suction directed into the suction chamber 47. It may also be mentioned that, although the relay switch 42 has been assumed as being of the normally-open type, a normally-closed relay switch may also be used where desired. Where the normally-closed relay switch is thus preferred, the thermostatically controlled temperature-responsive switch 44 to control the relay switch should be so constructed as to be open to hold the relay switch closed when the engine is being driven cold and to close to make the relay switch open when the operating temperature is reached by the engine.

The combustion chamber 30 is most effective to heat and uniformly vapourize the air-fuel mixture to be supplied to the engine where it is positioned in direct contact with the mixture at the bottom of the intake manifold riser 21. The heating and vapourizing effect will be further improved if the combustion chamber 30 is at least partly in contact with another part of the mixture passage downstream of the throttle valve 16 of the main carburetor 10 such as the intake manifold branches 22 posterior to the manifold riser.

The air-fuel mixture supply unit of the exhaust cleaning system according to the present invention has been assumed in the shown embodiment as using the carburetor of the usual construction. This, however, is merely for the purpose of illustration and thus the mixture supply unit may be of the known fuel injection type having usual fuel injection nozzles which are electromagnetically operated to inject the fuel into the engine cylinders when the thermostatically controlled temperature-responsive switch 44 responds to an engine temperature lower than a predetermined level. Where desired, moreover, the mixture supply unit of the exhaust cleaning system may be supplied with air and/or fuel from sources which are independent from the air cleaner 11 and/or float bowl 15 associated with the main carburetor 10 for the engine proper.

It will now be appreciated from the foregoing description that the exhaust cleaning system herein disclosed is effective to operate under the cold driving condition of the internal combustion engine for preheating the air-fuel mixture passing through the mixture supply passage leading to the engine cylinders so that the combustion of the mixture in the engine cylinders can be effected at an increased efficiency without resort to the use of an enriched air-fuel mixture during cold driving. The exhaust cleaning system according to the present invention is thus capable of reducing the unburned or partly burned toxic compounds in the engine exhaust gases emitted when the engine is being warmed up from cold and is therefore expected to provide a useful solution to the vehicular air-pollution problems which are presently confronted. The complete combustion of the mixture in the engine will be achieved more effectively where the hot exhaust gases which have heated the heat-transfer partition member are recirculated to the upstream side of the mixture passage to the engine and injected into the mixture for promoting the vapourization thereof.

I claim:

1. An exhaust cleaning system for use with an automotive internal combustion engine having an air-fuel mixture supply passage for supplying a vapourized air-fuel mixture to engine cylinders, which system comprises a combustion chamber positioned in direct contact with an interior of at least part of said air-fuel mixture supply passage for the engine through at least one heat transfer partition member, an air-fuel mixture supply unit for supplying a mixture of air and fuel to said combustion chamber when actuated, firing means for igniting the air-fuel mixture drawn into said combustion chamber from said mixture supply unit when actuated means responsive to change in temperature of the engine and operative to actuate both of said mixture supply unit and said firing means in response to a temperature of the engine lower than predetermined relatively low level, and mixture supply rate control means associated with said air-fuel mixture supply unit and providing controlled communication between said mixture supply passage and said combustion chamber when actuated by said temperature-responsive actuating means, said mixture supply rate control means including a suction-operated valve drive unit having suction and atmospheric chambers which are hermetically sealed from each other by a diaphram element and resilient biasing means urging the diaphram element to a position compressing the atmospheric chamber, the suction chamber being in controlled communication with said intake manifold of the engine through a suction passageway, a solenoid-operated three-way valve interposed in said suction passageway and electrically connected to said temperature-responsive actuating means, said three-way valve having a position to provide communication between said suction chamber and said intake manifold of the engine when actuated by said temperature-responsive actuating means and a position to interrupt said communication and venting said suction chamber to the open air when inoperative, and a flow control valve which is operatively connected to said diaphragm element for being rotatable in unison with displacement of the diaphragm element within said valve drive unit, said flow control valve being turned to substantially close said mixture supply unit when said three way valve is held inoperative and accordingly said diaphragm element is moved to said position compressing said atmospheric chamber by the action of said resilient biasing means and being turned to substantially fully open said mixture supply unit when said three way valve is in said position providing communication thereacross through said suction passageway for moving said diaphragm element moved away from said position compressing said atmospheric chamber against the action of said resilient biasing neabs.

2. An exhaust cleaning system as claimed in claim 1, in which said mixture supply rate control means is further associated with said air-fuel mixture supply passage for the engine and responsive to an idling condition of the engine for appropriately increasing a rate of flow of the air-fuel mixture through said mixture supply passage when actuated by said temperature-responsive actuating means during idling of the engine.

3. An exhaust cleaning system as claimed in claim 1, in which said combustion chamber has an outlet which is in constant communication with said air-fuel mixture supply passage for the engine through a hot gas recirculation passageway.

4. An exhaust cleaning system as claimed in claim 3, in which said hot gas recirculation passageway is externally provided with a plurality of fins.

5. An exhaust cleaning system as claimed in claim 3, further comprising a flame holder which is positioned at an outlet of said hot gas recirculation passageway to said air-fuel mixture passage for the engine.

6. An exhaust cleaning system as claimed in claim 1, in which said heat-transfer partition member has formed on at least one of its faces a plurality of fins.

7. An exhaust cleaning system as claimed in claim 1, further comprising a flame holder which is positioned at an inlet to said combustion chamber from said air-fuel mixture supply unit of cleaning system.

8. An exhaust cleaning system as claimed in claim 1, which said temperature-responsive actuating means comprises a thermostatically controlled temperature responsive switch which is in contact with a cooling medium for responding to a temperature of the engine lower than said predetermined level and a relay switch connected between said firing means and said temperature responsive actiaging for being closed when the temperature responsive switch responds to said temperature.

9. An exhaust cleaning system as claimed in claim 1, in which said internal combustion engine is combined with a carburetor upstream of said air-fuel mixture supply passage.

10. An exhaust cleaning system as claimed in claim 9, in which said carburetor is of a down-draft type.

11. An exhaust cleaning system as claimed in claim 10, in which said air-fuel mixture supply passage has a vertical portion connected to a lowermost end of said carburetor, wherein said heat-transfer partition member is positioned at a bottom of said vertical portion.

12. An exhaust cleaning system as claimed in claim 9, in which said carburetor is a horizontal-draft type.

13. An exhaust cleaning system as claimed in claim 1, in which said engine is of a fuel injection type.

14. A combination with an automotive internal combustion engine having a carburetor connected to engine cylinders through an intake manifold including a manifold riser and manifold branch pipes, of a combustion chamber which is positioned in direct contact with an interior of at least part of said intake manifold through at least one heat-transfer partition member, an air-fuel mixture supply unit for supplying a mixture of air and fuel to said combustion chamber when actuated, firing means for igniting the air-fuel mixture drawn into said combustion chamber from said mixture supply unit when actuated, temperature-responsive actuating means responsive to change in temperature of the engine and operative to actuate both of said mixture supply unit and said firing means in response to a temperature of the engine lower than a predetermined level substantially representative of a cold driving condition of the engine, and mixture supply rate control means associated with said air-fuel mixture supply unit and providing controlled communication between said mixture supply passage and the combustion chamber when actuated by said temperature-responsive actuating means, said mixture supply rate control means including a suction-operated valve drive unit having suction and atmospheric chambers which are hermetically sealed from each other by a diaphragm element and resilient biasing means urging the diaphragm element to a position compressing the atmospheric chamber, the suction chamber being in controlled communication with said intake manifold of the engine through a suction passageway, a solenoid-operated three-way valve interposed in said suction passageway and electrically connected to said temperature-responsive actuating means, said three-way valve having a position to provide communication between said suction chamber and said intake manifold of the engine when actuated by said temperature-responsive actuating means and a position to interrupt said communication and venting said suction chamber to the open air when inoperative, and a flow control valve which is operatively connected to said diaphragm element for being rotatable in unison with displacement of the diaphragm element within said valve drive unit, said flow control valve being turned to substantially close said mixture supply unit when said three way valve is held inoperative and accordingly said diaphragm element is moved to said position comprising said atmospheric chamber by the action of said resilient biasing means and being turned to substantially fully open said mixture supply unit when said three way valve is in said position providing communication thereacross through said suction passageway for moving said diaphragm element moved away from said position compressing said atmospheric chamber against the action of said resilient biasing means.

15. A combination as claimed in claim 14, in which said combustion chamber is contact with the interior of at least part of said manifold riser.

16. A combination as claimed in claim 15, in which said combustion chamber is further in contact with the interior of at least part of said manifold branch pipes.

17. A combination as claimed in claim 14, in which said diaphragm element is connected to said flow control valve through an actuating rod extending into said mixture supply unit.

18. A combination as claimed in claim 17, in which said actuating rod has an extension which is operatively connected to a throttle valve of said carburetor for turning the throttle valve to a wider-open position from a part-throttle condition when said three-way valve is actuated by said temperature-responsive actuating means during idling of the engine.

19. A combination as claimed in claim 14, in which said air-fuel mixture supply unit comprises a carburetor which is independent of said carburetor for the engine.

20. A combination as claimed in claim 19, in which said carburetor of the air-fuel mixture supply unit has an air inlet which is vented to the open air through a restriction.

21. A combination as claimed in claim 14, in which said combustion chamber has an outlet which is in constant communication with an upstream portion of said intake manifold via a hot gas recirculation passageway.

22. A combination as claimed in claim 14, in which said combustion chamber has an outlet which is directly opened to the atmosphere.

23. A combination as claimed in claim 14, in which said heat transfer partition member is 0.5mm to 3mm thick.

24. A combination as claimed in claim 23, in which said heat-transfer partition member is formed of a material selected from the group consisting of copper, brass, aluminium, and steel.

25. A combination as claimed in claim 24, in which said heat-transfer partition member is formed of copper and has a thickness ranging from 1.0mm to 2.0mm.

26. A combination as claimed in claim 14, in which said carburetor is of a down-draft type.

27. A combination as claimed in claim 26, in which said heat-transfer partition member is positioned at a bottom of the manifold riser.

* * * * *